3,143,425
SINGLE-STEP PROCESS OF PRODUCING
HOP EXTRACTS
Adam Mueller, Coburg, Germany, assignor to Chemisches Laboratorium Dr. A. Mueller, Coburg, Germany, a corporation of Germany
No Drawing. Filed June 30, 1961, Ser. No. 120,965
Claims priority, application Germany July 7, 1960
6 Claims. (Cl. 99—50.5)

The present invention relates to a process of producing hop extracts and more particularly to a single-step process of producing hop extracts, and to hop extract concentrates obtained thereby.

Heretofore, a number of processes of producing hop extracts have been known. These processes are carried out either in several steps or in a single-step operation.

In the known multi-step processes the bitter constituents and the tanning constituents of hops are obtained separately and are subsequently combined before addition to the wort or before use. Such multi-step processes, however, require more than double the extraction time and more than twice the costs of energy than the single-step rocesses. Furthermore, the warm extracts of the acidic bitter constituents and the soft resins of hops which are obtained by extraction with organic solvents and distillation of the solvent are exposed to the oxidative influence of atmospheric oxygen for an unnecessarily long period of time. As a result thereof, considerable amounts of hard resins which are substantially valueless are formed at the expense of the valuable humulons and soft resins. Addition of antioxidants to such hop extracts, however, inhibits or even prevents conversion of lupulon which has no bitter taste into the corresponding bitter soft resins. The tanning constituents and the bitter constituents, when freed of solvents, are of such high viscosity that it is not possible, even when increasing the temperature during mixing of both components, to obtain such a fine degree of dispersion in the mixture as desired by the brewing industry.

The disadvantages of the known single-step extraction processes in which the bitter constituents of hops are extracted with alcohol or the like solvents, whereby up to 3.5% of water are introduced by the hops, consists in a considerable reduction of the yield of bitter constituents in contrast to the use of substantially anhydrous solvents. Said reduction in yield is due to the water present in the solvent. Another disadvantage of the single-step extraction process is the limited extraction of the tanning constituents. These disadvantages are especially evident when carrying out the extraction at about 20° C.

It is one object of the present invention to provide a single-step extraction process which does not have the disadvantages of the known processes and which produces extracts with a high yield of bitter and tanning constituents.

Another object of the present invention is to provide a highly valuable hop extract of a predetermined ratio of bitter and tanning constituents in the extract.

Still another object of the present invention is to provide a process of producing malted beverages such as beer, wherein boiling with the new hop extract according to the present invention is considerably reduced in duration.

Other objects of the present invention and advantageous features thereof will become apparent as the description proceeds.

In principle the single-step extraction process according to the present invention consists in carrying out the extraction with a mixture of an organic solvent and a dilute aqueous ammonia solution. Organic solvents as they are advantageously used in the extraction process according to the present invention are, for instance, lower aliphatic halogenated hydrocarbons, such as trichloro ethylene, methylene dichloride; lower aliphatic alcohols, such as methanol, ethanol, and others; ethers, such as diethyl ether; petroleum ether; aliphatic ketones, such as acetone; esters of acetic acid, such as its methyl or ethyl ester; or mixtures of such solvents. At least 10% and at the most 40% of a dilute aqueous ammonia solution are admixed to such organic solvents and the previously comminuted hops are extracted with such a mixture. If necessary, the hops may be further comminuted with the addition of such solvents before they are extracted. Extraction is preferably effected at room temperature. In order to avoid formation of an emulsion when using a solvent which is difficultly soluble in water, it is advisable to admix a readily water soluble solvents thereto, such as methanol.

The extract containing a mixture of bitter and tanning constituents of the hops is freed of the solvents by evaporation to dryness under a pressure of about 0.5 atmosphere and at a temperature of about 60° C. while stirring. Thereby the solvent and water are distilled off in the form of an azeotropic mixture.

According to a preferred embodiment of the present invention it is of advantage to introduce additional ammonia into the distilling extract during the first half of the distillation process. The amount of ammonia additionally introduced is such that the pH-value of the extract remains at a pH between about 8.5 and about 9.0.

The addition of 10% to 40% of a dilute aqueous ammonia solution to the organic solvent yields a pH of about 8.5 to 9.0. As a result thereof the humulons are converted to a large extent, even without heating, into their iso-compounds. That such a conversion into the iso-compounds takes place is rather surprising, because heretofore it was known that conversion of the humulons into their iso-compounds is highly dependent on the pH-value of the solution and on the temperature of the solution. Heretofore such a conversion took place without boiling or with gentle heating only when using strongly alkaline solutions while, when using weakly alkaline solutions, a prolonged boiling time was always required. In contrast thereto, when operating according to the present invention and extracting hops with an organic solvent and a highly diluted ammonia solution, no boiling or heating is required.

Furthermore, it was known that, when allowing the alkaline solution of the iso-humulons to stand for a prolonged period of time, conversion into the non-bitter humulic acid took place. Thus, in order to avoid formation of such non-bitter humulic acid, buffering agents, such as salts, had to be added during the alkaline treatment of the crude hops. Such buffering agents, however, were subsequently dissolved by the wort and, consequently, were present in the beer. This is, of course, highly undesirable.

However, when proceeding according to the present invention, no conversion of the iso-humulons into humulic acid takes place, even on prolonged extraction. The yield of bitter constituents is especially high when using a solvent mixture which consists of a readily volatile acetic acid ester such as acetic acid methyl ester, an alcohol such as methanol, and/or a lower aliphatic halogenated hydrocarbon, such as methylene chloride or ethylene chloride, or a readily volatile ketone, such as acetone, and 10% to 40% of a highly diluted aqueous ammonia solution containing 0.5 liter to 1 liter of ammonia per liter of water.

The dilute aqueous ammonia solution used together with the organic solvents for extracting hops contains between about 0.040 percent and about 0.075 percent, and preferably between about 0.05 percent and about 0.06 percent of ammonia. Lower and higher concentrations may also be used, although the concentrations given hereinabove have proved to give fully satisfactory results.

The particular advantage of the process according to the present invention consists in the rapid and complete dissolution of the humulons by the above mentioned solvents in combination with water containing ammonia and in their immediate conversion into the beer-soluble iso-compounds without the formation of hard resins. Thus the bitter constituents of hops are utilized without any loss.

A further advantage of the process according to the present invention is the fact that the ratio of tanning constituents to bitter constituents in the final extract can be predetermined as desired by using a specific water content of the solvents while operating otherwise under the same conditions. For instance, when a ratio of bitter constituents to water soluble portions of 1:1 is desired in the extract, it is sufficient to add about 30% of water in the form of a dilute aqueous ammonia solution; to the solvent. The content of water soluble portions of the extract can be increased by adding 40% of water to the anhydrous pure solvent or solvent mixture. Such a higher content of water soluble portions is, for instance, required in the food industry, in the production of coffee substitutes, and the like.

Using hop extracts according to the present invention in the brewing process has the advantage that the time of boiling wort with the extract can be considerably shortened. Ordinarily the hop boiling process lasts for one and a half hours to two hours while with the new hop extracts it is reduced to 1½ hours to ¾ hour. This is due to the fact that the beer-soluble bitter constituents of the hops are present in the dissolved state.

Hard resin formation is reduced to a minimum when proceeding according to the present invention. This is due to the fact that the humulon and iso-humulon which are molecularly dissolved in the above mentioned organic solvents, are much more slowly oxidized than the colloidally dissolved humulon which is present in colloidal suspension as obtained, for instance, in an aqueous alkaline solution. The colloidally dissolved humulon is capable of absorbing oxygen much more rapidly and in larger amounts than the molecularly dissolved humulon/isohumulon of the present invention.

It is an essential feature of the present invention that the known organic solvents are used for extraction. Thereby the water insoluble solvents dissolve the bitter constituents and the water soluble solvents dissolve a small amount of tanning constituents. In order to completely dissolve the tanning constituents, water must be added because such agents are only soluble in water. The solubility of the bitter constituents is even more increased by using water containing ammonia. Thus, when using a solvent mixture of water soluble and/or water insoluble organic solvents with water containing ammonia, it is possible to extract from hops in a single-step process all the commercially interesting hop constituents which are essential to the brewing industry.

The following examples serve to illustrate the present invention without, however, limiting the same thereto.

Chemical analysis of the concentrated hop extracts obtained according to said examples is carried out according to the method described by Woellmer in "Allgemeine Brauer- und Hopfenzeitung," 1930, No. 269. Because concentrated hop extracts cannot be completely separated into bitter constituents and tanning constituents, because the tanning constituents are insoluble in ether, it is necessary to subject the hop extract to the following preliminary treatment before carrying out the Woellmer analysis.

5.0 g. of hop extract were shaken in a shaking cylinder methanol for ten minutes. The mixture was filtered and the filtrate was placed into a 100 cc. measuring flask. The residue in the shaking cylinder was rinsed several times with small amounts of methanol and the methanol was filtered. The measuring flask was filled up to 100 cc. with methanol at 20° C.

50 cc. of said solution were placed into a separating funnel and were shaken therein with 100 cc. of a 1% sodium chloride solution, 1 cc. of 24.5% sulfuric acid, and 70 cc. of diethyl ether for ten minutes. The mixture was allowed to settle and to separate into an ethereal and an aqueous phase. The ethereal solution was evaporated to dryness in a vacuum and a carbon dioxide atmosphere for half an hour in order to remove the last traces of water from the hop resin extract. The hop resins were dissolved in 50 cc. of methanol and the resulting methanolic solution was then further worked up and analyzed as described by Woellmer.

EXAMPLE 1

(a) 1 kg. of comminuted hops of a water content of 9% is extracted with 30 kg. of trichloro ethylene while stirring continuously for two hours. The spent hop residue is separated from the mixture of solvent and bitter constituents and the trichloro ethylene is removed from the remaining hop resins by distillation.

In a second step the trichloro ethylene adhering to the spent hop residue, is removed by a treatment with steam.

The solvent-free steam-treated spent hop residue is then boiled in a third step of operation with 10 kg. of water in order to recover the tanning constituents of the hops. The resulting water extract containing the tanning constituents is substantially completely freed of water by distillation.

In a fourth step of operation, the two intermediate extracts, the extract of bitter hop constituents and the extract of tanning hop constituents, are mixed wih each other by stirring vigorously.

(b) 1 kg. of comminuted hops of a water content of 9% is extracted with 30 kg. of trichloro ethylene and 10 kg. of water for two hours, while stirring continuously. Thereafter, the extract is separated from the hop residue by pressure filtration. The hop residue is washed with 5 kg. of anhydrous pure trichloro ethylene and is again filtered. The solvent mixture is distilled off in a vacuum at about 50° C., while stirring continuously.

(c) 1 kg. of comminuted hops of a water content of 10% are extracted at 22° C. with a mixture consisting of 25 kg. of ethylene dichloride and 5 kg. of water containing 1.0 liter of ammonia dissolved in 1 kg. of water for two hours while stirring continuously. The pH-value of the extract under these conditions is between 8.5 and 9.0. Working up of the hop extract, washing of the spent hop residue with anhydrous ethylene dichloride, and separation of the washed hop residue from the extract as well as concentration of the resulting extract are carried out as described under (b). 240 g. of hop extract are obtained thereby.

(d) 1 kg. of comminuted hops of a water content of 10% is extracted with a mixture consisting of 11 kg. of anhydrous pure methylene dichloride, 11 kg. of anhydrous pure methanol, and 8 kg. of water containing about 0.75 liter of ammonia in 1 kg. of water, i.e., such an amount of ammonia that the pH-value of the extraction liquid is between 8.5 and 9.0, for two hours while stirring. Separation of the extracted hop residue and washing thereof with the above mentioned solvent mixture as well as filtration and concentration of the extract are carried out as described hereinabove under (b). 420 g. of concentrated hops are obtained thereby. The resulting concentrated hop extracts obtained according to Examples 1(a) to 1(d) were analyzed according to the method of Woellmer. The following values were found, whereby the air-dried extracts were used:

Table

|  | (a), percent | (b), percent | (c), percent | (d), percent |
|---|---|---|---|---|
| Water content | 12.0 | 11.5 | 10.0 | 10.5 |
| Total resins | 41.8 | 41.0 | 62.0 | 35.4 |
| Total soft resins | 32.5 | 37.5 | 56.4 | 32.0 |
| $\alpha$-Acids | 13.0 | 14.6 |  |  |
| Iso-$\alpha$-Acids | 0.0 | 1.5 | 25.2 | 14.3 |
| Hard resins | 9.3 | 3.5 | 5.6 | 3.4 |
| Tanning constituents | 3.4 | 3.2 | 1.9 | 5.4 |

These data show clearly that the single-step process of Example 1(b) using a mixture of solvent and water, which is carried out under about the same conditions as the multi-step process of Example 1(a), is superior to said multi-step process of Example 1(a) inasmuch as no essential conversion of the total soft resins into hard resins takes place. The hard resins do not impart bitter taste to the beer and, therefore, their formation must be considered as a loss. The amount of valuable $\alpha$-acids in the single-step process is also higher than in the multi-step process.

The analytical data obtained with the extracts of Examples 1(c) and 1(d), which were prepared by extracting hops with a mixture of solvents and ammonia-containing water at a pH of 8.5 to 9.0, show that complete conversion of the $\alpha$-acid into the more valuable iso-$\alpha$-acid is effected. These Examples 1(c) and 1(d) show, furthermore, that it is possible, depending upon the solvent mixture used, to produce in a single step process either an extract of a low content of tanning constituents but a high content of total resins (Example 1(c)) or an extract which has a high content of tanning constituents and a low content of total resins (Example 1(d)), while the $\alpha$-acids in such extracts are substantially completely converted into the iso-$\alpha$-acids. The single-step process according to Example 1(b) thereby no ammonia is added, does not permit such a differentiation in the contents of tanning constituents and in the ratio of tanning constituent to bitter constituents in the hop extracts.

It is, of course, understood that many changes and variations in the extraction, the separation of the spent hop residue, the reaction temperature and duration, the methods of working up the extracts and of producing the concentrated hop extract, and the like may be made by those skilled in the art in accordance with the principles set forth herein and in the claims annexed hereto.

I claim:

1. In a process of producing hop extracts by extraction of hops with organic solvents, the steps which comprise mixing comminuted hops simultaneously with an organic solvent and with water containing ammonia in an amount sufficient to impart to the mixture of hops, solvent and water a pH-value between about 8.5 and about 9.0, the amount of water present in the extraction mixture being between about 10% and about 40% of the organic solvent, separating the resulting extract from the spent hop residue, removing the solvent therefrom, and concentrating the extract.

2. The process according to claim 1, wherein the amount of ammonia present in said mixture is between about 0.5 liter and about 1.0 liter of ammonia per liter of water.

3. The process according to claim 1, wherein mixing is effected at room temperature.

4. The process according to claim 1, wherein the organic solvent used in said mixing is a solvent selected from the group consisting of a lower aliphatic halogenated hydrocarbon, a lower alkanol, a lower dialkyl ether, a lower ketone, an ester of acetic acid with a lower alkanol, petroleum ether, and mixtures thereof.

5. The process according to claim 1, wherein the organic solvent is a mixture of a water insoluble solvent and a water soluble solvent.

6. The process according to claim 1, wherein the organic solvent is a mixture of methylene dichloride and methanol.

References Cited in the file of this patent

UNITED STATES PATENTS

| 2,243,143 | Wood | May 27, 1941 |
| 2,562,934 | Michener et al. | Aug. 7, 1951 |
| 2,652,333 | Nilsson et al. | Sept. 15, 1953 |
| 2,898,209 | Murtaugh et al. | Aug. 4, 1959 |